(12) United States Patent
Rodman et al.

(10) Patent No.: US 9,694,321 B2
(45) Date of Patent: Jul. 4, 2017

(54) EXHAUST TREATMENT SYSTEM WITH PARTICULATE FILTER HAVING WALL-FLOW AND FLOW-THROUGH CHANNELS

(71) Applicant: Caterpillar Inc., Peoria, IL (US)

(72) Inventors: Anthony Rodman, Peoria, IL (US); Ronald Silver, Peoria, IL (US); Sylvain Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 6 days.

(21) Appl. No.: 14/841,949

(22) Filed: Sep. 1, 2015

(65) Prior Publication Data

US 2017/0056824 A1 Mar. 2, 2017

(51) Int. Cl.
| | | |
|---|---|---|
| *B01D 53/92* | (2006.01) | |
| *B01D 53/94* | (2006.01) | |
| *B01D 46/00* | (2006.01) | |
| *F01N 3/035* | (2006.01) | |

(Continued)

(52) U.S. Cl.
CPC ..... *B01D 53/9431* (2013.01); *B01D 53/9418* (2013.01); *F01N 3/021* (2013.01); *F01N 3/2066* (2013.01); *B01D 2255/1021* (2013.01); *B01D 2255/1023* (2013.01); *B01D 2255/1025* (2013.01); *B01D 2255/904* (2013.01); *B01D 2255/9155* (2013.01)

(58) Field of Classification Search
CPC ............ B01D 2279/30; B01D 2267/40; B01D 2267/00; B01D 2258/01; B01D 2255/9155; B01D 2255/915; B01D 46/0024; B01D 46/0023; B01D 46/00; B01D 53/944; B01D 53/94; B01D 53/92; F01N 3/2066; F01N 3/103; F01N 3/035; F01N 3/021

See application file for complete search history.

(56) References Cited

U.S. PATENT DOCUMENTS 4,828,807 A * 5/1989 Domesle ............. B01D 53/944
423/213.7
4,887,427 A * 12/1989 Shinzawa ............. F01N 3/023
60/286

(Continued)

FOREIGN PATENT DOCUMENTS

| DE | 60222826 T2 * | 7/2008 | ......... B01D 46/0039 |
| JP | 61286513 A | 12/1986 | |
| JP | 2004156564 A * | 6/2004 | ............... F01N 3/20 |

*Primary Examiner* — Timothy Vanoy
(74) *Attorney, Agent, or Firm* — Baker Hostetler

(57) ABSTRACT

In one aspect, an exhaust treatment system includes a first particulate filter that has an oxidation catalyst and receives an exhaust stream from an engine. The first particulate filter has a first filter body that defines a plurality of flow-through channels, each open on the inlet and outlet sides of the first filter body. The first filter body also defines a plurality of wall-flow channels, each open on one of the inlet and outlet sides and closed on the other of the inlet and outlet sides. The system also has a second particulate filter that receives the exhaust stream from the first particulate filter. The second particulate filter has a second filter body that defines a plurality of wall-flow channels, each open on one of the inlet and outlet sides of the second particulate filter and closed on the other of the inlet and outlet sides of the second particulate filter.

20 Claims, 4 Drawing Sheets

(51) Int. Cl.
*F01N 3/021* (2006.01)
*F01N 3/20* (2006.01)

(56) References Cited

U.S. PATENT DOCUMENTS

| | | | |
|---|---|---|---|
| 5,067,320 A * | 11/1991 | Kanesaki | F01N 3/025 422/169 |
| 5,214,020 A | 5/1993 | Shimoda | |
| 6,883,311 B2 * | 4/2005 | Liu | F01N 3/035 60/274 |
| 7,340,888 B2 | 3/2008 | Zhang et al. | |
| 7,799,289 B2 | 9/2010 | Robel | |
| 8,136,349 B2 | 3/2012 | Gieshoff et al. | |
| 2006/0196167 A1 * | 9/2006 | Odajima | F01N 11/002 60/277 |
| 2006/0254263 A1 * | 11/2006 | Allansson | F01N 3/0211 60/296 |
| 2008/0016848 A1 * | 1/2008 | Widenmeyer | B01D 46/0063 60/282 |
| 2010/0269491 A1 | 10/2010 | Boorse et al. | |
| 2011/0107746 A1 | 5/2011 | Matsumoto et al. | |
| 2013/0289857 A1 * | 10/2013 | Schmitt | F01N 11/005 701/113 |
| 2014/0234188 A1 * | 8/2014 | Hartland | B01D 53/9477 423/212 |
| 2016/0251994 A1 * | 9/2016 | Yoshikawa | F01N 9/002 |

\* cited by examiner

US 9,694,321 B2

EXHAUST TREATMENT SYSTEM WITH PARTICULATE FILTER HAVING WALL-FLOW AND FLOW-THROUGH CHANNELS

TECHNICAL FIELD

The present disclosure relates to the treatment of exhaust gases generated by internal combustion engines, and more specifically to systems and methods used to treat exhaust gases.

BACKGROUND

Conventional internal combustion engines such as diesel engines and gasoline engines generate exhaust streams that include a number of different air pollutants. These air pollutants include gaseous components, such as carbon monoxide (CO) and nitrogen oxides ($NO_x$), and solid particulate matter known as soot. Therefore, conventional engines are often implemented with exhaust treatment systems that include a plurality of different exhaust treatment modules. One such module, known as a selective catalytic reduction (SCR) module, combines a gaseous or liquid reductant (e.g., urea or ammonia) with the exhaust stream and then reacts the combined stream with a catalyst to convert $NO_x$ in the exhaust stream into diatomic nitrogen ($N_2$) and water ($H_2O$). The effectiveness of the SCR module can generally be improved by increasing the ratio of nitrogen dioxide ($NO_2$) to nitrogen monoxide (NO). Therefore, another module, known as a diesel oxidation catalyst (DOC), is commonly implemented upstream of the SCR module to convert NO to $NO_2$.

Yet another module, known as a particulate trap, is commonly implemented upstream of the SCR module to trap soot in the exhaust stream. One type of particulate trap utilized in conjunction with diesel engines is known as a diesel particulate filter (DPF). The soot accumulated within the DPF can be burned away through a process called regeneration.

A recent trend in exhaust treatment systems is to combine the SCR module and the DPF into a single module. U.S. patent application publication no. 2014/0234118 allegedly teaches an exhaust treatment system having a DOC module, a DPF module downstream of the DOC module, and a combined SCR and DPF module that is downstream of the DPF module. The DPF module filters particles falling within a first size range, and the combined SCR and DPF module filters particles falling within a second size range, where the particles in the first size range are generally smaller than the particles in the second size range.

SUMMARY

In one aspect of the present disclosure, an exhaust treatment system has a first particulate filter and a second particulate filter. The first particulate filter is configured to receive an exhaust stream from an engine and filter a portion of particulate matter in the exhaust stream to generate a reduced-particulate exhaust stream. The first particulate filter includes a first filter body having an oxidation catalyst, and the first filter body includes a first inlet side and a first outlet side spaced from the first inlet side. The first filter body defines a first plurality of flow-through channels between the first inlet side and the first outlet side and a first plurality of wall-flow channels between the first inlet side and the first outlet side. The second particulate filter is configured to receive the reduced-particulate exhaust stream from the first outlet side of the first filter and filter remaining particulate matter in the reduced-particulate exhaust stream. The second particulate filter includes a second filter body that includes a second inlet side and a second outlet side spaced from the second inlet side. Further, the second filter body defines a second plurality of wall-flow channels between the second inlet side and the second outlet side.

Another aspect of the present disclosure is a method of treating an exhaust stream from an engine. The method comprises receiving the exhaust stream from an engine at a first inlet side of a first particulate filter. The first particulate filter includes a first filter body having an oxidation catalyst and includes the first inlet side and a first outlet side spaced from the first inlet side. The first filter body defines a first plurality of flow-through channels between the first inlet side and the first outlet side and a first plurality of wall-flow channels between the first inlet side and the first outlet side. The method further comprises filtering particulate matter in the exhaust stream via the first plurality of flow-through channels and the first plurality of wall-flow channels to generate a reduced-particulate exhaust stream, and receiving the reduced-particulate exhaust stream at a second inlet side of a second particulate filter. The second particulate filter includes a second filter body that includes a second inlet side and a second outlet side spaced from the second inlet side. The second filter body defines a second plurality of wall-flow channels between the second inlet side and the second outlet side. The method further comprises filtering remaining particulate matter in the reduced-particulate exhaust stream via the second plurality of wall-flow channels defined by the second filter body.

BRIEF DESCRIPTION OF THE DRAWINGS

The foregoing summary, as well as the following detailed description of embodiments of the application, will be better understood when read in conjunction with the appended drawings. For the purposes of illustrating the methods and apparatuses of the present application, there is shown in the drawings representative embodiments. It should be understood, however, that the application is not limited to the precise methods and apparatuses shown. In the drawings.

DETAILED DESCRIPTION

Figure 1:
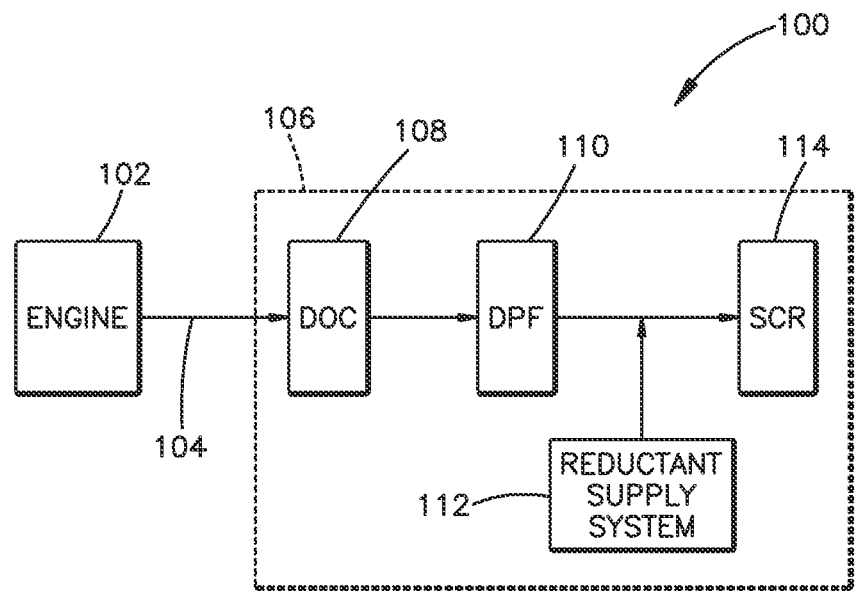
FIG. 1 shows a simplified schematic diagram of an engine system having an engine and a conventional exhaust treatment system.

Certain terminology is used in the following description for convenience only and is not limiting. The words "right", "left", "lower" and "upper" designate directions in the drawings to which reference is made. The words "inner" or "distal" and "outer" or "proximal" refer to directions toward and away from, respectively, the engine and related parts thereof. The terminology includes the above-listed words, derivatives thereof and words of similar import.

Referring to FIG. 1, a simplified schematic diagram is shown of an engine system 100 having an engine 102 and a conventional exhaust treatment system 106. The engine 102 may be, for example, a diesel engine that generates an exhaust stream including gaseous pollutants and solid particulate matter such as soot. The engine 102 has an exhaust outlet 104, which provides the exhaust stream to the exhaust treatment system 106. The exhaust treatment system 106 includes a diesel oxidation catalyst (DOC) module 108, a diesel particulate filter (DPF) module 110 connected to the output of the DOC module 108, a selective catalytic reduction (SCR) module 114 connected to the output of the DPF module 110, and a reductant supply system 112 connected between the output of the DPF module 110 and the input of the SCR module 114.

The exhaust stream flows from the exhaust outlet 104 to the DOC module 108, which is implemented using a flow-through filter coated with an oxidation catalyst. The oxidation catalyst converts the nitrogen monoxide (NO) components in the exhaust stream to nitrogen dioxide ($NO_2$) as the exhaust stream passes from the inlet side of the flow-through filter to the outlet side.

The exhaust stream with the converted $NO_2$ flows from the DOC module 108 to the DPF module 110. The DPF module 110 is implemented using a wall-flow filter that traps solid particulate matter such as soot, while allowing the gaseous components of the exhaust stream to pass to the outlet of the DPF module 110. The gaseous components of the exhaust stream output from the DPF module 110 are combined with a reductant (e.g., urea or ammonia), which is sprayed into the exhaust stream by a reductant supply system 112.

The exhaust stream with reductant flows to the SCR module 114, which is implemented using a flow-through filter that is coated in an SCR catalyst. The SCR catalyst promotes a reaction between the reductant and nitrogen oxides ($NO_x$) in the exhaust stream to form diatomic nitrogen ($N_2$) and water ($H_2O$).

During treatment of the exhaust stream, particulate matter accumulates in the DPF module 110. To prevent the DPF module 110 from becoming clogged, the particulate matter is removed using a process known as passive regeneration, which is facilitated by the $NO_2$ generated by the DOC module 108. In particular, the DPF module 110 receives the $NO_2$ generated by the DOC module 108, and the $NO_2$ reacts with carbon (soot) in the particulate matter trapped in the DPF module 110 to form carbon monoxide (CO) and NO, thereby reducing the amount of carbon (soot) in the DPF module 110. While the engine is running, the DOC module 108 continuously provides $NO_2$ to the DPF module 110, thereby allowing passive regeneration to continuously reduce the particulate matter trapped in the DPF module 110.

Conventional exhaust treatment systems that implement separate DOC, DPF, and SCR modules such as the exhaust treatment system 106 on FIG. 1 are relatively big. In fact, these convention systems may occupy a volume that is as much as 36 times the engine displacement, making it difficult to integrate these systems with engines and with vehicles in which the engines are to be mounted. In addition, these conventional systems are relatively expensive due to the number of separate modules implemented and the amount of conduit that is used to interconnect the modules.

Size concerns have led to the development of a combined DPF and SCR module in which the flow-through filter of the DPF module is coated with SCR catalyst. The combined DPF and SCR module can be used to replace the separate DPF module 110 and SCR module 114 in FIG. 1. However, the SCR function of the combined module competes with the DPF function for $NO_2$ within the exhaust stream, such that the DPF is deprived of $NO_2$ that would otherwise be used to reduce the amount of soot trapped in the DPF. As a result, the ability of the DPF to reduce soot is diminished to such an extent that passive regeneration alone is not sufficient to prevent clogging of the combined DPF and SCR module. Further, depriving the DPF of $NO_2$ increases the balance point of the system, such that the balance point, which occurs when the rate of soot entering the filter is substantially equal to the oxidation rate (i.e., the soot being removed), is not reached until the filter is close to its soot mass limit. Thus, conventional systems that utilize combined DPF and SCR modules have relatively high balance points in comparison to conventional systems in which the DPF and SCR modules are separate.

To prevent clogging of the combined DPF and SCR module, the combined DPF and SCR module may be regenerated using active regeneration, wherein additional heat is periodically provided to the combined module to burn off the soot particles trapped in the combined module. For example, in some implementations, an active regeneration device such as a fuel-fired burner or an electric heater located upstream of the combined module applies heat to the soot to elevate the temperature of the soot to an ignition threshold. In other implementations, the engine is operated under conditions in which additional fuel is injected into the cylinder late in the engine operating cycle. Excess unburned fuel becomes entrained in the exhaust gas and enters the combined module. The combined module oxidizes the unburned fuel generating heat which burns off the soot particles trapped in the combined module.

However, active regeneration has several drawback. For example, the addition of active regeneration devices can increases cost and size, thereby reducing some of the cost and size advantages that are gained by combining DPF and SCR functions. As another example, active regeneration occurs periodically, rather than continuously. As yet another example, injecting fuel into the cylinder late in the operating cycle may cause an increase in fuel consumption and in $CO_2$ and $NO_x$ emissions, and some of the fuel to mix with engine oil, thereby reducing viscosity and lubricity of the oil. Therefore, there is a need for compact exhaust treatment systems having reduced cost and size and that may be regenerated using passive regeneration.

Figure 2:
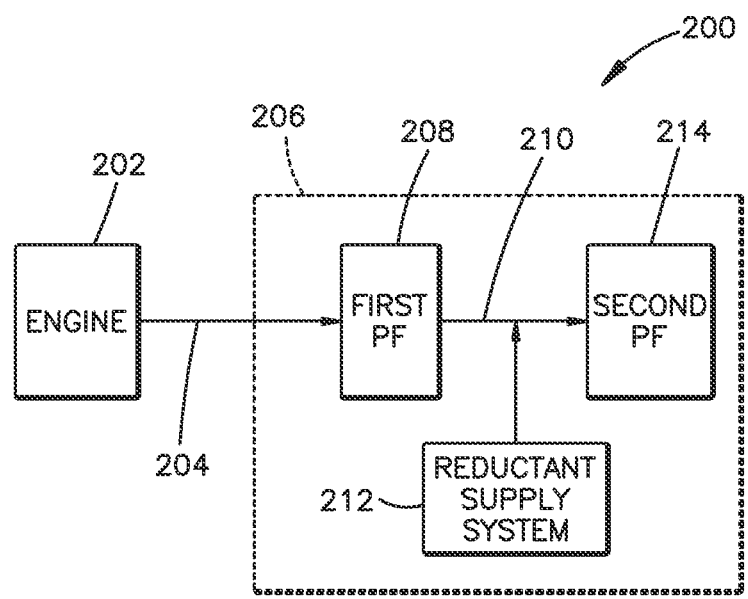
FIG. 2 shows a simplified schematic diagram of an engine system having an engine and an exhaust treatment system according to one embodiment.

Turning now to FIG. 2, a simplified schematic diagram is shown of an engine system 200 according to one embodiment having an engine 202 and an exhaust treatment system 206. The engine 202 may be a diesel engine, a gasoline engine, or any suitable engine that generates an exhaust stream including gaseous pollutants and solid particulate matter such as soot. The engine 202 has an exhaust outlet 204, which provides the exhaust stream to the exhaust treatment system 206. The exhaust treatment system 206 includes a first particulate filter (PF) 208, a second particulate filter 214 connected to the output of the first particulate filter 208 via a conduit 210, and a reductant supply system 212 in fluid communication with the conduit 210 between the outlet of the first particulate filter 208 and the inlet of the second particulate filter 214.

The exhaust stream flows from the exhaust outlet 204 of the engine 202 to the first particulate filter 208, which has an oxidation catalyst. In general, the first particulate filter 208 (i) filters the particulate matter (e.g., soot) of a first portion of the exhaust stream, (ii) concurrently allows particulate matter of a second portion of the exhaust stream to pass from the inlet side of the first particulate filter to the outlet side of the first particulate filter, and (iii) concurrently converts the nitrogen monoxide (NO) components of the exhaust stream to nitrogen dioxide ($NO_2$) as the exhaust stream passes from the inlet side of the first particulate filter to the outlet side.

Figure 3:
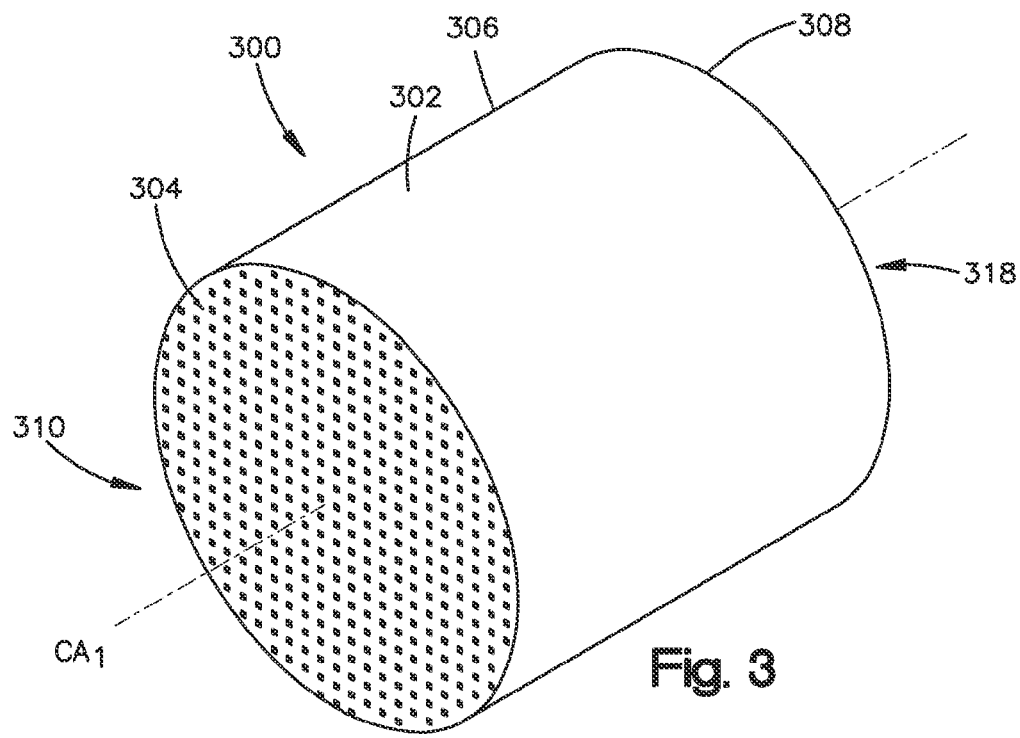
FIG. 3 shows a perspective view of a first particulate filter according to one embodiment that may be used to implement the first particulate filter of FIG. 2.
Figure 4:
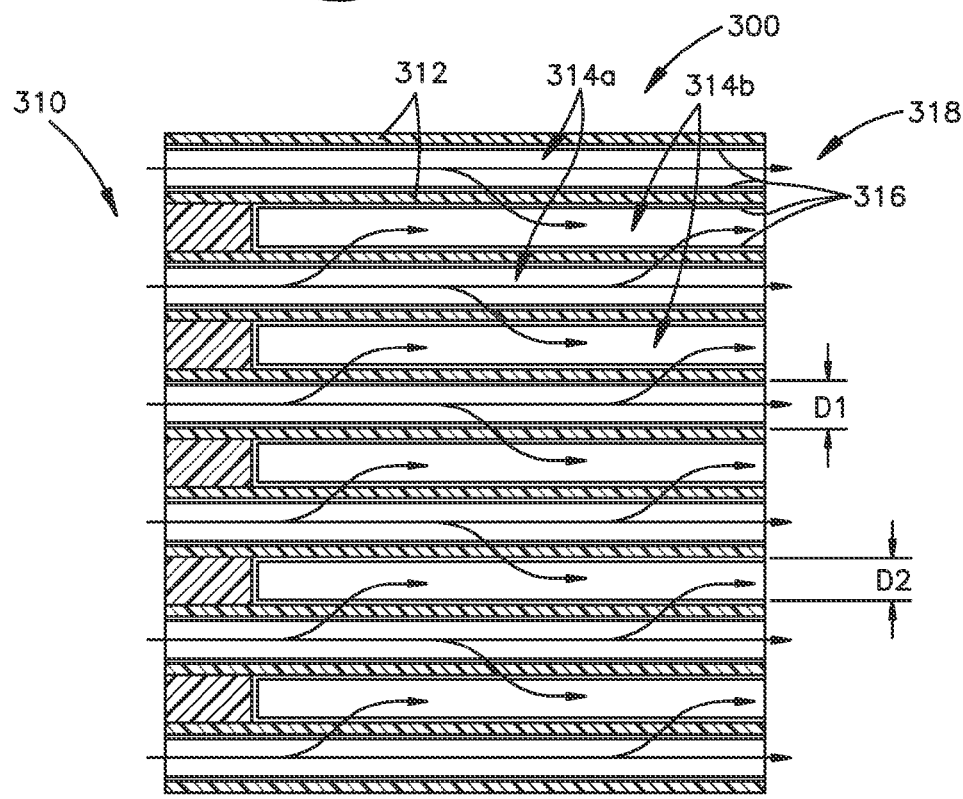
FIG. 4 shows a cross-sectional view of a few of the channels of the particulate filter of FIG. 3.

Referring to FIGS. 3 and 4, perspective and cross-sectional views are shown of a first particulate filter 300 according to one embodiment that may be used to implement the first particulate filter 208 of FIG. 2. The first particulate filter 300 has a first filter body 302 that is cylindrically-shaped. The first filter body 302 includes a first inlet surface 304 that defines a first inlet side 310 of the first particulate filter 300, and an opposed first outlet surface 308 that defines a first outlet side 318 of the first particulate filter 300. The first outlet surface 308 is spaced from the first inlet surface 304 along a first path that can lie in a first axial direction that is substantially parallel to a first central axis $CA_1$ of the first particulate filter 300. The first filter body 302 also includes a first outer surface 306 that is curved and extends circumferentially around the first central axis $CA_1$ and along the first axial direction from the inlet surface 304 to the first outlet surface 308. It will be understood that, in alternative embodiments, the first particulate filter may have any other suitable shape having a first inlet side and a first outlet side such as (without limitation) a cube, cuboid, or hexagonal prism.

The first filter body 302 includes a plurality of walls 312 that extend from the inlet surface 304 to the outlet surface 308 along the first axial direction. The plurality of walls 312 define a first plurality of open or flow-through channels 314a that are open on opposed ends and a first plurality of partially-closed or wall-flow channels 314b that are closed on one of the opposed ends but not the other. The number of flow-through channels 314a may be less than, greater than, or equal to the number of wall-flow channels 314b. In at least some embodiments, from about 20 to about 80 percent of the channels may be flow-through channels, and in some of these embodiments, about 50 percent of the channels may be flow-through channels.

Each of the first plurality of flow-through channels 314a extends from the first inlet side 310 to the first outlet side 318 and is open on the first inlet side 310 and the first outlet side 318. Each wall-flow channel 314b extends from the first outlet side 318 and terminates before the first inlet side 310, such that each wall-flow channel 314b is open on the first outlet side 318 and closed on the first inlet side 310. Each channel 314a and 314b has a square-shaped cross-section in a plane that is substantially perpendicular to the first central axis $A_1$, although in alternative embodiments, the cross-section may be circular, rectangular, hexagonal, or any other suitable shape. Each flow-through channel 314a defines a first dimension D1 in a direction substantially perpendicular to the first axial direction, such as a height, width, or diameter of the flow-through channel 314a. Further, each wall-flow channel 314b defines a second dimension D2 in a direction substantially perpendicular to the first axial direction, such as a height, width, or diameter of the wall-flow channel 314b. The first and second dimensions D1 and D2 can be equal to one another and can be constant from the first inlet side 310 to the first outlet side 318. Further, the cross-sectional shape of each of the flow-through channels 314a and wall-flow channels 314b can be constant along the first axial direction.

It will be understood that, in some embodiments, the first dimension D1 can be larger than or smaller than the second dimension D2. Further, it will be understood that, in some embodiments, the first dimension D1 can vary from one flow-through channel 314a to the next, and the second dimension D2 can vary from one wall-flow channel 314b to the next. Yet further, it will be understood that, in some embodiments, for each channel 314a and 314b, the corresponding first or second dimension D1 and D2 can vary in the first axial direction from the first inlet side 310 to the first outlet side 318. For example, the first dimension D1 can decrease from the first inlet side 310 to the first outlet side 318 such that the flow-through channels 314a taper toward the first outlet side 318, or can increase from the first inlet side 310 to the first outlet side 318 such that the flow-through channels 314a taper toward the first inlet side 318. Similarly, the second dimension D2 can increase or decrease from the first inlet side 310 to the first outlet side 318. It will also be understood, that the cross-sectional shape of each channel 314a and 314b can be constant along the first axial direction from the first inlet side 310 to the first outlet side 318, or can vary along the first axial direction from the first inlet side 310 to the first outlet side 318. To accommodate these differently-configured channels 314a and 314b, it will be understood that the thicknesses of the walls 312 can vary as necessary.

The first filter body 302 can be formed of ceramic such as (without limitation) cordierite, mullite, and silicon carbide. In at least some embodiments, the first filter body 302 can be a monolithic ceramic structure. Alternatively, the first filter body 302 may be formed with a suitable metal. The oxidation catalyst can be a coating 316 applied to the first filter body 302 by means of a wash coat, and can comprise one or more types of metal such as platinum, rhodium, palladium, or an alloy of two or more metals. The oxidation catalyst may alternatively, or in addition, be embedded within the material of the first filter body 302.

In at least some embodiments, the first filter body 302 has a porosity between about 50 and about 70 percent, and in at least some of these embodiments, the first filter body 302 has a porosity between about 60 and about 65 percent. In at least some embodiments, the first particulate filter 300 filters between about 30 and about 90 percent of the particulate matter, and in at least some of these embodiments, the first particulate filter 300 filters between about 40 and about 60 percent of the particulate matter.

When the exhaust stream flows to the first inlet side 310 of the first particulate filter 300, the first particulate filter 300 filters first and second portions of the exhaust stream. In particular, the plurality of flow-through channels 314a receive the first portion of the exhaust stream, and each flow-through channel 314a allows at least some of the first portion, including particulate matter in the first portion, to pass relatively unimpeded to the first outlet side 318. In particular, at least some of the first portion passes along a path that extends in the first axial direction from the first inlet side 310 directly to the first outlet side 318, without passing through the walls 312 of the first particulate filter 300. Some of the first portion of the exhaust flow may also pass from the flow-through channels 314a through the walls 312 and into adjacent channels. In such a case, the walls 312 prevent some or all of the particulate matter in the first portion from passing into the adjacent channels.

The second portion of the exhaust stream is filtered by the plurality of wall-flow channels 314b. The closed end of each wall-flow channel 314b allows gasses in the second portion of the exhaust stream to pass into the wall-flow channel 314b. The gasses that pass into the wall-flow channel 314b are combined with the first portion of the exhaust stream in the wall-flow channels 314b and/or at the first outlet side 318. The closed end of each wall-flow channel 314b also prevents some or all of the particulate matter in the second portion from entering the wall-flow channel 314b. As a result, the closed ends of the wall-flow channels 314b at the first inlet side 310 limit or prevent altogether the accumulation of particulate matter from the second portion of the exhaust stream inside the first filter body 302.

As the particulate matter of the exhaust stream comes into contact with the oxidation catalyst 316, the oxidation catalyst 316 converts the NO components in the exhaust stream to $NO_2$. A portion of this $NO_2$ reacts with soot in the particulate matter to form CO and NO, thereby reducing the amount of soot in the first particulate filter 300 through passive regeneration. Another portion of this $NO_2$ is passed from the first outlet side 318 downstream of the first particulate filter 300, and is used by the second particulate filter (e.g., second particulate filter 214 of FIG. 2) for passive regeneration of the second particulate filter.

Figure 5:
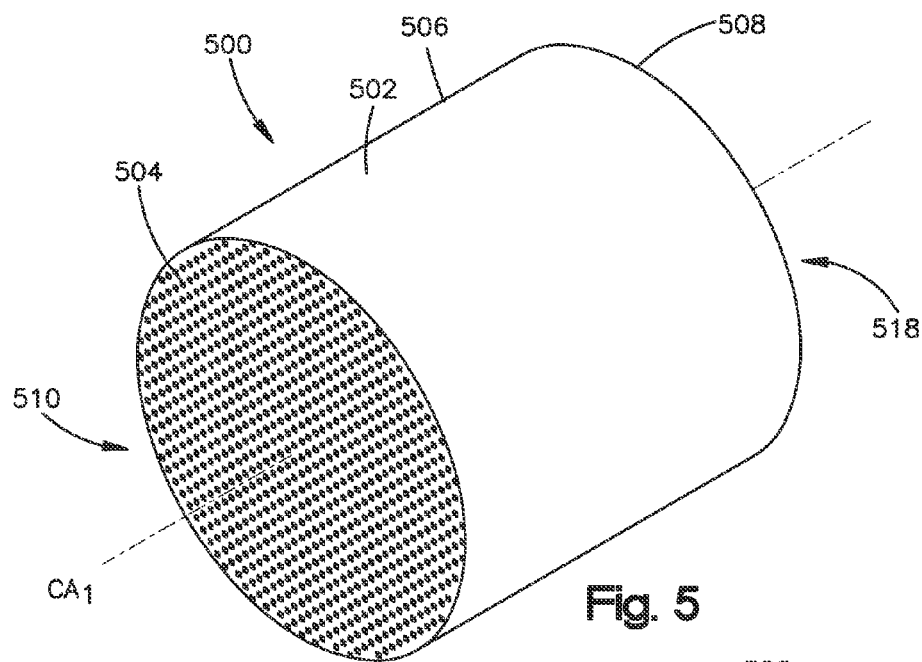
FIG. 5 shows a perspective view of a first particulate filter according to another embodiment that may be used to implement the first particulate filter of FIG. 2.
Figure 6:
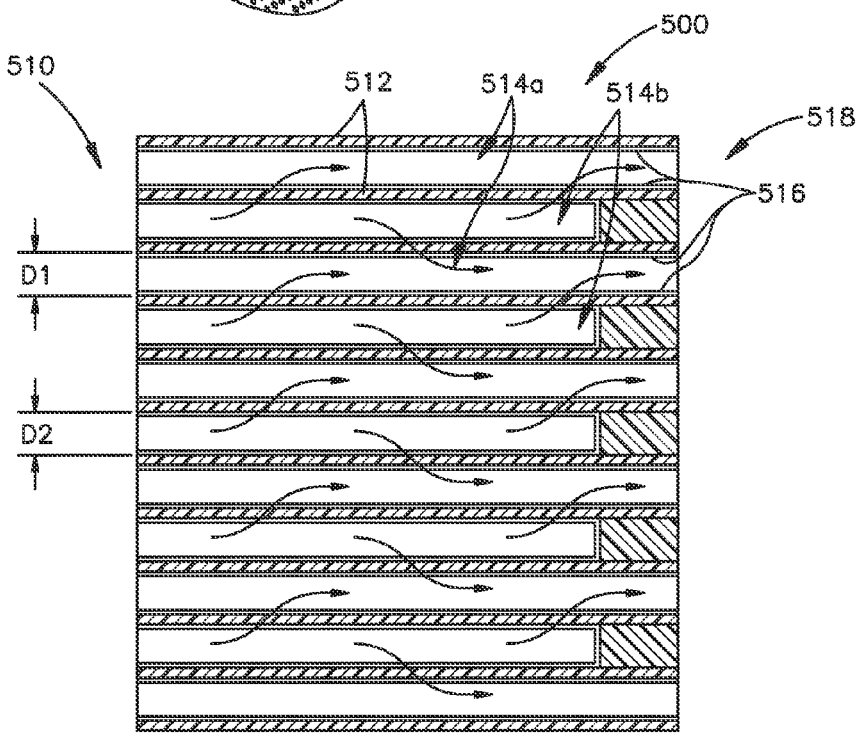
FIG. 6 shows a cross-sectional view of a few of the channels of the particulate filter of FIG. 5.

Turning now to FIGS. 5 and 6, perspective and cross-sectional views of a first particulate filter 500 according to another embodiment is shown that may be used to implement the first particulate filter 208 of FIG. 2. As will be described in further detail below, the first particulate filter 500 differs from the first particulate filter 300 of FIG. 3 in that the first particulate filter 500 has wall-flow channels 514b that are closed at the outlet side 518 of the first particulate filter 500, rather than the inlet side. The first particulate filter 500 has a first filter body 502 that is cylindrically-shaped. The first filter body 502 includes a first inlet surface 504 that defines a first inlet side 510 of the first particulate filter 500, and an opposed first outlet surface 508 that defines a first outlet side 518 of the first particulate filter 500. The first outlet surface 508 is spaced from the first inlet surface 504 along a first path that can lie in a first axial direction that is substantially parallel to a first central axis $CA_1$ of the first particulate filter 500. The first filter body 502 also includes a first outer surface 506 that is curved and extends circumferentially around the first central axis $CA_1$ and along the first axial direction from the inlet surface 504 to the first outlet surface 508. It will be understood that, in alternative embodiments, the first particulate filter may have any other suitable shape having a first inlet side and a first outlet side such as (without limitation) a cube, cuboid, or hexagonal prism.

The first filter body 502 includes a plurality of walls 512 that extend from the inlet surface 504 to the outlet surface 508 along the first axial direction. The plurality of walls 512 define a first plurality of flow-through channels 514a and a first plurality of wall-flow channels 514b. The number of flow-through channels 514a may be less than, greater than, or equal to the number of wall-flow channels 514b. Each of the first plurality of flow-through channels 514a extends from the first inlet side 510 to the first outlet side 518 and is open on the first inlet side 510 and the first outlet side 518. Each wall-flow channel 514b extends from the first inlet side 510 and terminates before the first outlet side 518, such that each wall-flow channel 514b is open on the first inlet side 510 and closed on the first outlet side 518. It will be understood that, in alternative embodiments, a first particulate filter can include a first filter body that defines a plurality of wall-flow channels that alternate such that some of the wall-flow channels are closed on the first inlet side, similar to wall-flow channels 314b of FIG. 4, and others of the wall-flow channels are closed on the first outlet side, similar to wall-flow channels 514b of FIG. 6. Further, it will be understood that, in alternative embodiments, the wall-flow channels can be closed (i.e., plugged) at any location between the first inlet side and the first outlet side.

Each channel 514a and 514b has a square-shaped cross-section in a plane that is substantially perpendicular to the first central axis $A_1$, although in alternative embodiments, the cross-section may be circular, rectangular, hexagonal, or any other suitable shape. Each flow-through channel 514a defines a first dimension D1 in a direction substantially perpendicular to the first axial direction, such as a height, width, or diameter of the flow-through channel 514a. Further, wall-flow channel 514b defines a second dimension D2 in a direction substantially perpendicular to the first axial direction, such as a height, width, or diameter of the wall-flow channel 514b. In FIG. 6, the first and second dimensions D1 and D2 are equal to one another and are constant from the first inlet side 510 to the first outlet side 518. Further, the cross-sections of each of the flow-through and wall-flow channels 514a and 514b are constant along the first axial direction.

It will be understood that, in some embodiments, the first dimension D1 can be larger than the second dimension D2, and in other embodiments, the second dimension can be larger than the first dimension D1. Further, it will be understood that, in some embodiments, the first dimension D1 can vary from one flow-through channel 514a to the next, and/or the second dimension D2 can vary from one wall-flow channel 514b to the next. Yet further, it will be understood that, in some embodiments, for each channel 514a and 514b, the corresponding first or second dimension D1 and D2 can vary in the first axial direction from the first inlet side 510 to the first outlet side 518. For example, the first dimension D1 can decrease from the first inlet side 510 to the first outlet side 518 such that the flow-through channels 514a taper toward the first outlet side 518 or can increase from the first inlet side 510 to the first outlet side 518 such that the flow-through channels 514a taper toward the first inlet side 518. Similarly, the second dimension D2 can decrease from the first inlet side 510 to the first outlet side 518 such that the wall-flow channels 514b taper toward the first outlet side 518 or can increase from the first inlet side 510 to the first outlet side 518 such that the wall-flow channels 514b taper toward the first inlet side 518. It will also be understood, that the cross-sectional shape of each channel 514a and 514b can be constant along the first axial direction from the first inlet side 510 to the first outlet side 518, or can vary along the first axial direction from the first inlet side 510 to the first outlet side 518. To accommodate these differently-configured channels 514a and 514b, it will be understood that the thicknesses of the walls 512 can vary as necessary.

The first filter body 502 can be formed ceramic such as (without limitation) cordierite, mullite, and silicon carbide. In at least some embodiments, the first filter body 502 can be a monolithic ceramic structure. Alternatively, the first filter body 502 may be formed with a suitable metal. The oxidation catalyst can be a coating 516 applied to the first filter body 502 by means of a wash coat, and can comprise one or more types of metal such as platinum, rhodium, palladium, or an alloy of two or more metals. The oxidation catalyst may alternatively, or in addition, be embedded within the material of the first filter body 502.

In at least some embodiments, the first filter body 502 has a porosity between about 50 and about 70 percent, and in at least some of these embodiments, the first filter body 502 has a porosity between about 60 and about 65 percent. In at least some embodiments, the first particulate filter 500 filters between about 30 and about 90 percent of the particulate matter, and in at least some of these embodiments, the first particulate filter 500 filters between about 40 and about 60 percent of the particulate matter.

When the exhaust stream flows to the first inlet side 510 of the first particulate filter 500, the exhaust stream is divided between the flow-through channels 514a and the wall-flow channels 514b. The plurality of flow-through channels 514a receive a first portion of the exhaust stream, and each flow-through channel 514a allows at least some of the first portion, including particulate matter in the first portion, to pass relatively unimpeded to the first outlet side 518. In particular, at least some of the first portion passes along a path that extends in the first axial direction from the first inlet side 510 directly to the first outlet side 518, without passing through the walls 512 of the first particulate filter 500. Some of the first portion of the exhaust flow may also pass from the flow-through channels 514a through the walls 512 and into adjacent channels. In such a case, the walls 512 prevent some or all of the particulate matter in the first portion from passing into the adjacent channels.

The plurality of wall-flow channels 514b receive a second portion of the exhaust stream as the plurality of flow-through channels 514a receives the first portion. The closed end of each wall-flow channel 514b prevents most, if not all, of the second portion of the exhaust stream from passing along a path that extends in the first axial direction from the first inlet side 510 to first outlet side 518. Consequently, to pass from the first inlet side 510 to the first outlet side 518, the gasses of the second portion of the exhaust stream pass through the walls 512 of the first particulate filter 500 and into adjacent channels 514a that are open at the first outlet side 518. The gasses that pass into the wall-flow channel 514b are combined with the first portion of the exhaust stream in the wall-flow channels 514b.

In filtering the particulate matter, the soot particles of the second portion of the exhaust stream are prevented from passing through the walls 512, and therefore, the particulate matter of the second portion becomes trapped in the first particulate filter 500, thereby preventing the solid particulate matter of the second portion of the exhaust stream from passing to the first outlet side 518. Thus, the first particulate filter 500 allows particulate matter of the first portion of the exhaust stream to pass to the first outlet side 518, while preventing particulate matter of the second portion from passing to the first outlet side 518.

As the particulate matter of the second portion accumulates in the first particulate filter 500, the oxidation catalyst converts the NO components in the exhaust stream to $NO_2$. A portion of this $NO_2$ reacts with soot in the particulate matter trapped in the first particulate filter 500 to form CO and NO, thereby reducing the amount of soot in the first particulate filter 500 through passive regeneration. Another portion of this $NO_2$ is passed from the first outlet side 518 downstream of the first particulate filter 500, and is used by the second particulate filter (e.g., filter 214 of FIG. 2) for passive regeneration of the second particulate filter.

Referring back to FIG. 2, the exhaust stream minus the soot from the second portion of the exhaust stream is output from the outlet side of the first particulate filter 208, where it is combined with a reductant (e.g., urea or ammonia) that is injected into the conduit 210 by a reductant supply system 212. The exhaust stream with reductant flows to the second particulate filter 214 that can include an SCR catalyst such that the second particulate filter 214 is a combined particulate filter (e.g., DPF) and SCR module. However, it will be understood that, in alternative embodiments, the second particulate filter 214 can include a particulate filter without an SCR catalyst, and the exhaust treatment system can be implemented without the reductant supply system 212. Further, in alternative embodiments, the second particulate filter 214 can include a particulate filter without an SCR catalyst, and the reductant supply system 212 and a separate SCR module (not shown) can be implemented upstream or downstream of the second particulate filter 214.

The second particulate filter can be, for example, a wall-flow filter. In general, the second particulate filter 214 filters at least some of the particulate matter remaining in the exhaust stream, and the SCR catalyst of the second particulate filter 214 promotes a reaction between the reductant and nitrogen oxides ($NO_x$) in the exhaust stream to form diatomic nitrogen ($N_2$) and water ($H_2O$). The resulting exhaust stream then flows downstream from the outlet of the second particulate filter 214, and is eventually expelled into the atmosphere.

In filtering the soot, the first particulate filter 208 filters particles, each particle having a size within a first size range that includes a first upper size limit and a first lower size limit. Further, the second particulate filter 214 filters particles of soot, each particle having a size within a second size range that includes a second upper size limit and a second lower size limit. The second upper and lower size limits are substantially equal to the first upper and lower size limits, respectively. Accordingly, the first and second particulate filters 208 and 214 filter particles in substantially the same overall size range. It will be understood, however, that in alternative embodiments, the first upper size limit can be greater than or less than the second upper size limit and/or the first lower size limit can be greater than or less than the second lower size limit. Thus, the first size range can be higher or lower than the second size range, with or without some overlap between the first and second size ranges.

Figure 7:
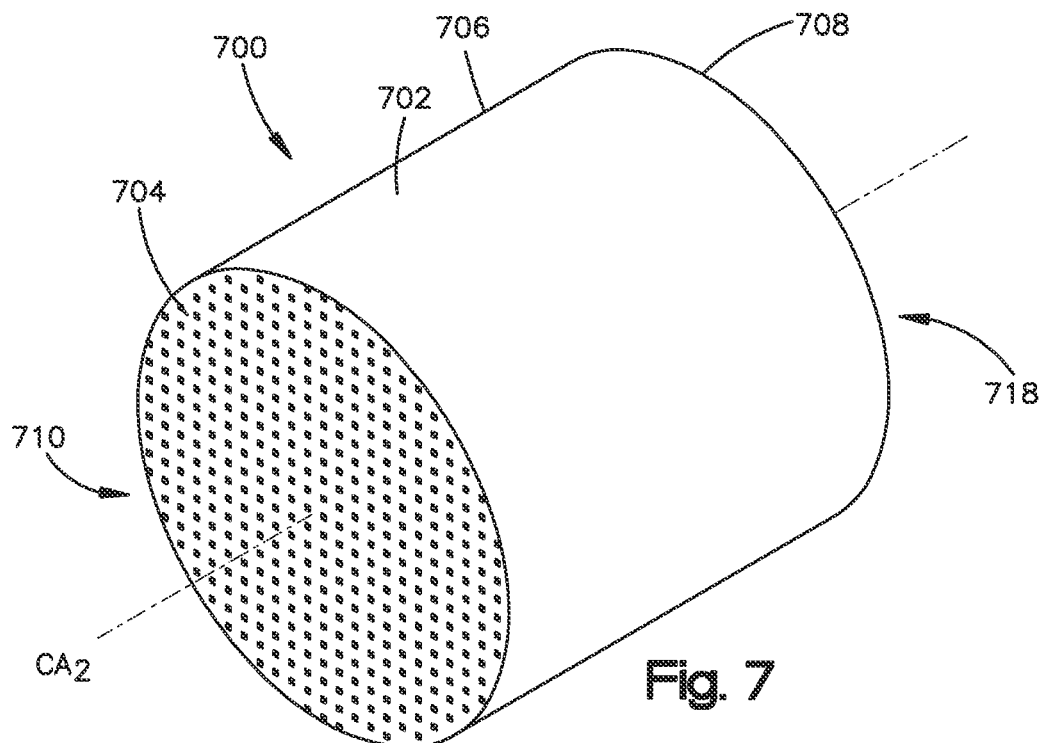
FIG. 7 shows a perspective view of a second particulate filter according to one embodiment that may be used to implement the second particulate filter of FIG. 2.
Figure 8:
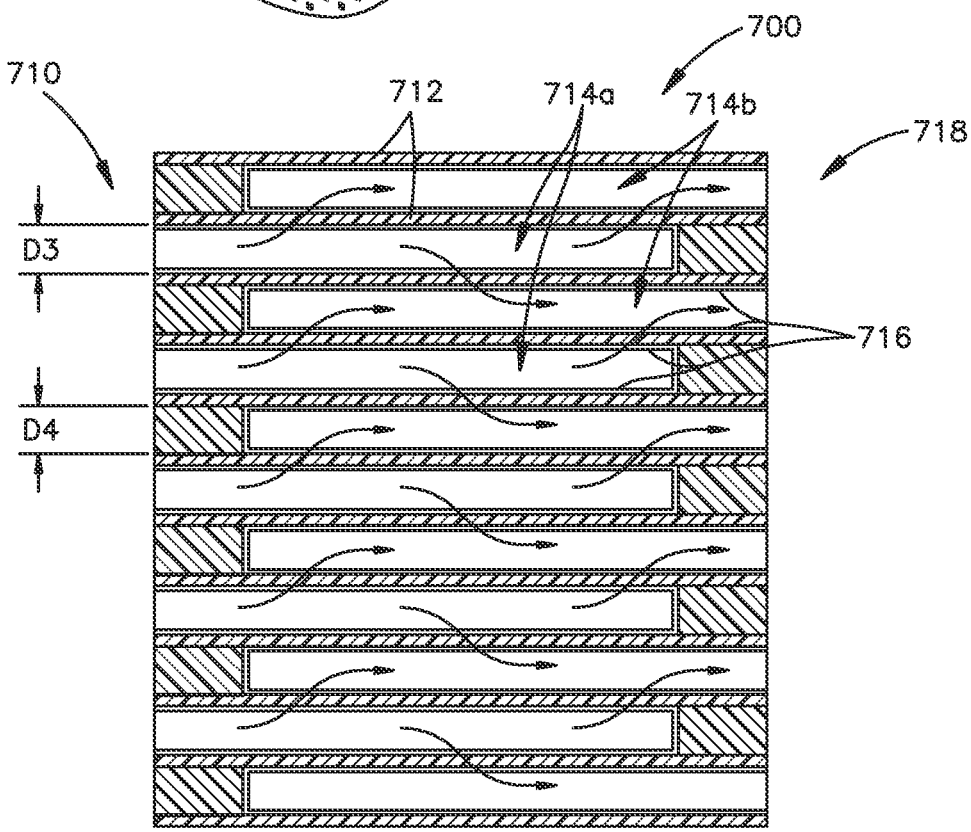
FIG. 8 shows a cross-sectional view of a few of the channels of the second particulate filter of FIG. 7.

Turning to FIGS. 7 and 8, perspective and cross-sectional views are shown of a second particulate filter 700 according to one embodiment that may be used to implement the second particulate filter of FIG. 2. Second particular filter 700 is a wall-flow filter having a second filter body 702 that is cylindrically-shaped. The second filter body 702 includes a second inlet surface 704 that defines a second inlet side 710 of the second particulate filter 700, and an opposed second outlet surface 708 that defines a second outlet side 718 of the second particulate filter 700. The second outlet surface 708 is spaced from the second inlet surface 704 along a second path that can lie in a second axial direction that is substantially parallel to a second central axis $CA_2$ of the second particulate filter 700. The second filter body 702 also includes a second outer surface 706 that is curved and extends circumferentially around the second central axis $CA_2$ and along the second axial direction from the second inlet surface 704 to the second outlet surface 708. It will be understood that, in alternative embodiments, the second particulate filter may have any other suitable shape having a second inlet side and a second outlet side such as (without limitation) a cube, cuboid, or hexagonal prism.

The second filter body 702 includes a second plurality of walls 712 that extend from the second inlet surface 704 to the second outlet surface 708 along the second axial direction. The second plurality of walls 712 define a second plurality of wall-flow channels 714a and a third plurality of wall-flow channels 714b. Each wall-flow channel 714a extends from the second inlet side 710 and terminates before the second outlet side 718, such that each wall-flow channel 714a is open on the second inlet side 710 and closed on the second outlet side 718. Each wall-flow channel 714b extends from the second outlet side 718 and terminates before the second inlet side 710, such that each wall-flow channel 714b is open on the second outlet side 718 and closed on the second inlet side 710. The number of wall-flow channels 714a may be less than, greater than, or equal to the number of wall-flow channels 714b.

Each channel 714a and 714b has a square-shaped cross-section in a plane that is substantially perpendicular to the second central axis $A_2$, although in alternative embodiments, the cross-section may be circular, rectangular, hexagonal, or any other suitable shape. Each wall-flow channel 714a defines a third dimension D3 in a direction substantially perpendicular to the second axial direction, such as a height, width, or diameter of the wall-flow channel 714a. Further, each wall-flow channel 714b defines a fourth dimension D4 in a direction substantially perpendicular to the second axial direction, such as a height, width, or diameter of the wall-flow channel 714b. In FIG. 8, the third and fourth dimensions D3 and D4 are equal to one another and are constant from the second inlet side 710 to the second outlet side 718. Further, the cross-sectional shape of each of the wall-flow channels 714a and 714b is constant along the second axial direction.

It will be understood that, in some embodiments, the third dimension D3 can be larger than the fourth dimension D4, and in other embodiments, the third dimension D3 can be larger than the fourth dimension D4. Further, it will be understood that, in some embodiments, the third dimension D3 can vary from one wall-flow channel 714a to the next, and/or the fourth dimension D4 can vary from one wall-flow channel 714b to the next. Yet further, it will be understood that, in some embodiments, for each channel 714a and 714b, the corresponding third or fourth dimension D3 and D4 can vary in the second axial direction from the second inlet side 710 to the second outlet side 718. For example, the third dimension D3 can decrease from the second inlet side 710 to the second outlet side 718 such that the wall-flow channels 714a taper toward the second outlet side 718 or can increase from the second inlet side 710 to the second outlet side 718 such that the wall-flow channels 714a taper toward the second inlet side 718. Similarly, the fourth dimension D4 can decrease from the second inlet side 710 to the second outlet side 718 such that the wall-flow channels 714b taper toward the second outlet side 718 or can increase from the second inlet side 710 to the second outlet side 718 such that the wall-flow channels 714b taper toward the second inlet side 718. It will also be understood, that the cross-sectional shape of each channel 714a and 714b can be constant along the second axial direction from the second inlet side 710 to the second outlet side 718, or can vary along the second axial direction from the second inlet side 710 to the second outlet side 718. To accommodate these differently-configured channels 714a and 714b, it will be understood that the thicknesses of the walls 712 can vary as necessary.

The second filter body 702 can be formed of ceramic such as (without limitation) cordierite, mullite, and silicon carbide. In at least some embodiments, the second filter body 702 can be a monolithic ceramic structure. Alternatively, the second filter body 702 can be formed with a suitable metal. The SCR catalyst can be a coating 716 applied to the second filter body 702 by means of a wash coat. The SCR catalyst may alternatively, or in addition, be embedded in the material of the second filter body 702.

When the reduced-particulate exhaust stream flows to the second inlet side 710 of the second particulate filter 700, a first portion of the reduced-particulate exhaust stream flows into the wall-flow channels 714a. However, the closed end of each wall-flow channel 714a prevents some or all of the first portion from passing along a path that extends in the second axial direction from the second inlet side 710 to second outlet side 718. Consequently, to pass from the second inlet side 710 to the second outlet side 718, gasses of the exhaust stream pass through the walls 712 of the second particulate filter 700 and into adjacent channels 714b that are open at the second outlet side 718 as indicated by the arrows.

Solid particulate matter is prevented from passing through the walls 712, and therefore, the solid particulate matter of the exhaust stream becomes trapped in the second particulate filter 700, thereby preventing the solid particulate matter from passing to the second outlet side 718. Thus, the second particulate filter 700 filters particulate matter that is not filtered by the first particulate filter (e.g., first particulate filter 208 of FIG. 2).

As the particulate matter accumulates in the second particulate filter 700, the $NO_2$ received from the first particulate filter 208 reacts with soot in the particulate matter to form CO and NO, thereby reducing the amount of soot in the second particulate filter 700 through passive regeneration. In at least some embodiments, the $NO_2$ generated by the first particulate filter 208 is sufficient to prevent the first and second particulate filters 208 and 214 from becoming clogged, without the need for a separate DOC module upstream of the first particulate filter 208. Therefore, the exhaust treatment system 206 of FIG. 2 can be devoid of a separate DOC module, yet still be regenerated using only passive regeneration. It will be understood that, in alternative embodiments, the $NO_2$ generated by the first particulate filter 208 can be sufficient to reduce the frequency in which one or both of the first and second particulate filter 208 and 214 becomes clogged, without eliminating clogging altogether. In these embodiments, one or both of the first and second particulate filter 208 and 214 can be regenerated using an active regeneration technique in combination with passive regeneration.

Exhaust treatment system 206 of FIG. 2 can be implemented to have a smaller size and a reduced cost than exhaust treatment systems that implement separate DOC, DPF, and SCR modules. Further, exhaust treatment system 206 of FIG. 2 can be operated with fewer occurrences of active regeneration than conventional exhaust treatment systems that implement combined DPF and SCR modules.

INDUSTRIAL APPLICABILITY

Referring back to FIG. 2, exhaust treatment system 206 can be implemented in any suitable on-vehicle or off-vehicle engine, including those regulated by the Tier 4 emission standards, to reduce soot levels. During operation, the exhaust treatment system 206 reduces soot levels in the exhaust stream in at least two steps. In particular, in the first step, the first particulate filter 208 filters soot in a first portion of the exhaust stream, while concurrently allowing particulate matter in a second portion of the exhaust stream to pass downstream. By filtering the soot in only a portion of the exhaust stream, as opposed to in an entirety of the exhaust stream, the balance point of the first particulate filter 208 can be kept relatively low. In other words, the balance point, which occurs when the rate of soot entering the filter is substantially equal to the oxidation rate (i.e., the soot being removed), is reached well before the filter approaches its soot mass limit. Thus, the first particulate filter 208 can have a relatively low balance point in comparison to a combined DPF and SCR module, and the first particulate filter 208 can be regenerated passively, without the need to perform active regeneration on the first particulate filter 208.

In the second step, the second particulate filter 214 filters soot remaining in the exhaust stream downstream of the first particulate filter 208. Since the second particulate filter 214 receives the exhaust stream with a reduced soot level, the balance point of the second particulate filter 214 can also be kept relatively low. Thus, the second particulate filter 214 can have a relatively low balance point in comparison to a combined DPF and SCR module, and the second particulate filter 214 can be regenerated passively, without the need to perform active regeneration on the second particulate filter 214.

It will be appreciated by those skilled in the art that changes could be made to the embodiments described above without departing from the broad inventive concept thereof. Furthermore, it should be appreciated that the structure, features, and methods as described above with respect to any of the embodiments described herein can be incorporated into any of the other embodiments described herein unless otherwise indicated. It is understood, therefore, that this invention is not limited to the particular embodiments disclosed, but it is intended to cover modifications within the spirit and scope of the present disclosure.

Unless explicitly stated otherwise, each numerical value and range should be interpreted as being approximate as if the word "about" or "approximately" preceded the value or range. Term "about" can be understood to include ±10% of the value or range.

We claim:

1. An exhaust treatment system, comprising:
   a first particulate filter configured to receive an exhaust stream from an engine and to generate a reduced-particulate exhaust stream, the first particulate filter including a first filter body having an oxidation catalyst, the first filter body including a first inlet side and a first outlet side spaced from the first inlet side, the first filter body defining a first plurality of flow-through channels between the first inlet side and the first outlet side allowing a portion of the exhaust stream to pass through the first filter body relatively unimpeded, and a first plurality of wall-flow channels between the first inlet side and the first outlet side; and
   a second particulate filter configured to receive the reduced-particulate exhaust stream from the first outlet side of the first particulate filter and filter remaining particulate matter in the reduced-particulate exhaust stream, the second particulate filter including a second filter body that includes a second inlet side and a second outlet side spaced from the second inlet side, the second filter body defining a second plurality of wall-flow channels between the second inlet side and the second outlet side.

2. The exhaust treatment system of claim 1, wherein:
   each of the first plurality of flow-through channels extends from the first inlet side to the first outlet side and is open on the first inlet side and the first outlet side; and
   each of the first plurality of wall-flow channels extends from one of the first inlet side and first outlet side and terminates before the other of the first inlet side and first outlet side such that the wall-flow channel is open on one of the first inlet side and first outlet side and closed on the other of the first inlet side and first outlet side.

3. The exhaust treatment system of claim 2, wherein each of the second plurality of wall-flow channels extends from one of the second inlet side and second outlet side and terminates before the other of the second inlet side and second outlet side such that the wall-flow channel is open on one of the second inlet side and second outlet side and closed on the other of the second inlet side and the second outlet side.

4. The exhaust treatment system of claim 1, wherein one or both of the first and second particulate filters is regenerated entirely passively, without using active regeneration.

5. The exhaust treatment system of claim 1, wherein the oxidation catalyst is coated onto the first filter body.

6. The exhaust treatment system of claim 1, wherein the second particulate filter includes a selective catalytic reduction (SCR) catalyst.

7. The exhaust treatment system of claim 1, wherein the exhaust treatment system is devoid of a filter having an oxidation catalyst upstream of the first particulate filter.

8. The exhaust treatment system of claim 1, wherein the first plurality of wall-flow channels includes a plurality of channels that are closed on the first inlet side and open on the first outlet side.

9. The exhaust treatment system of claim 1, wherein the first plurality of wall-flow channels includes a plurality of channels that are open on the first inlet side and closed on the first outlet side.

10. The exhaust treatment system of claim 1, wherein the first particulate filter filters particles having a size within a first upper size limit and a first lower size limit, the second particulate filter filters particles having a size within a second upper size limit and a second lower size limit, and the second upper and lower size limits are substantially equal to the first upper and lower size limits, respectively.

11. The exhaust treatment system of claim 1, wherein the first filter body includes a ceramic monolith.

12. The exhaust treatment system of claim 1, wherein the first particulate filter filters between about 30 and about 90 percent of the particulate matter.

13. The exhaust treatment system of claim 1, wherein the first particulate filter filters between about 40 and about 60 percent of the particulate matter.

14. The exhaust treatment system of claim 1, wherein the first filter body includes walls having a porosity between about 50 and about 70 percent.

15. A method of treating an exhaust stream, comprising:
   receiving the exhaust stream from an engine at a first inlet side of a first particulate filter, the first particulate filter including a first filter body having an oxidation catalyst and including the first inlet side and a first outlet side spaced from the first inlet side, the first filter body defining a first plurality of flow-through channels between the first inlet side and the first outlet side allowing a first portion of the exhaust stream to pass through the first filter body relatively unimpeded, and a first plurality of wall-flow channels between the first inlet side and the first outlet side;
   filtering particulate matter in a second portion of the exhaust stream via the first plurality of flow-through channels and the first plurality of wall-flow channels to generate a reduced-particulate exhaust stream;
   receiving the reduced-particulate exhaust stream and the first portion of the exhaust stream at a second inlet side of a second particulate filter, the second particulate filter including a second filter body that includes a second inlet side and a second outlet side spaced from the second inlet side, the second filter body defining a second plurality of wall-flow channels between the second inlet side and the second outlet side; and filtering remaining particulate matter in the reduced-particulate exhaust stream and the first portion of the exhaust stream via the second plurality of wall-flow channels defined by the second filter body.

16. The method of claim 15, further comprising the oxidation catalyst of the first particulate filter converting nitrogen monoxide components in the exhaust stream to nitrogen dioxide.

17. The method of claim 15, comprising passively regenerating one or both of the first and second particulate filters without using active regeneration.

18. The method of claim 15, comprising reacting the reduced-particulate exhaust stream and the first portion of the exhaust stream with a selective catalytic reduction (SCR) catalyst of the second particulate filter.

19. The method of claim 15, comprising passing the exhaust stream from the engine to the first particulate filter without first passing the exhaust stream to another filter having an oxidation catalyst.

20. The method of claim 15, wherein:

filtering the exhaust stream comprises the first particulate filter filtering particles having a size within a first upper size limit and a first lower size limit; and filtering the reduced-particulate exhaust stream comprises the second particulate filter filtering particles having a size within a second upper size limit and a second lower size limit, wherein the second upper and lower size limits are substantially equal to the first upper and lower size limits, respectively.

* * * * *